(12) United States Patent
Mayo (10) Patent No.: US 11,268,846 B1
(45) Date of Patent: Mar. 8, 2022

(54) LUGGAGE SCALE STRAP

(71) Applicant: Brian Mayo, Wylie, TX (US)

(72) Inventor: Brian Mayo, Wylie, TX (US)

( * ) Notice: Subject to any disclaimer, the term of this patent is extended or adjusted under 35 U.S.C. 154(b) by 0 days.

(21) Appl. No.: 16/385,049

(22) Filed: Apr. 16, 2019

(51) Int. Cl.
| | |
|---|---|
| A45C 13/30 | (2006.01) |
| A45C 15/00 | (2006.01) |
| G01G 19/58 | (2006.01) |
| G01G 23/37 | (2006.01) |
| G01G 3/14 | (2006.01) |
| G01G 23/16 | (2006.01) |
| G01G 19/18 | (2006.01) |
| G01G 7/00 | (2006.01) |
| G01G 19/52 | (2006.01) |

(52) U.S. Cl.
CPC ............. *G01G 19/18* (2013.01); *A45C 13/30* (2013.01); *A45C 15/00* (2013.01); *G01G 3/14* (2013.01); *G01G 7/00* (2013.01); *G01G 19/52* (2013.01); *G01G 19/58* (2013.01); *G01G 23/166* (2013.01); *G01G 23/3728* (2013.01)

(58) Field of Classification Search
CPC .... G01G 3/14; G01G 3/1402; G01G 13/1406; G01G 19/18; G01G 19/52; G01G 19/58; G01G 23/163; G01G 23/166; G01G 23/3728; G01G 23/3735; G01G 23/3742; G01G 7/00; A45C 13/30; A45C 15/00
See application file for complete search history.

(56) References Cited

U.S. PATENT DOCUMENTS

| | | | | |
|---|---|---|---|---|
| 2,927,784 A | * | 3/1960 | Lyons ..................... | G01G 3/145 177/2 |
| 5,415,176 A | * | 5/1995 | Sato ....................... | A61B 5/0537 177/245 |
| 5,756,938 A | * | 5/1998 | Kono ..................... | G01G 3/147 177/199 |
| 5,915,608 A | * | 6/1999 | Mao ......................... | A45F 5/02 224/257 |
| 6,092,572 A | * | 7/2000 | Green ....................... | B27L 7/00 144/193.1 |
| 7,084,357 B2 | * | 8/2006 | Roberts ................... | A45C 15/00 177/131 |

(Continued)

FOREIGN PATENT DOCUMENTS

WO    2012085512    6/2012

*Primary Examiner* — Randy W Gibson
(74) *Attorney, Agent, or Firm* — Kyle A. Fletcher, Esq.

(57) ABSTRACT

The luggage scale strap attaches to a luggage item as a shoulder strap. The luggage scale strap weighs the luggage item, detects changes in the weight of the luggage item, and alerts an appropriate authority when a weight change has been detected by the luggage scale strap in the luggage item. The presumption of the disclosure at bar is that a weight change in the luggage item indicates to the appropriated authority that something has been inappropriately added to or removed from the luggage item. The luggage scale strap comprises a shoulder strap, a control circuit, a personal data device, and the luggage item. The shoulder strap contains the control circuit. The shoulder strap attaches to the luggage item. The control circuit monitors the weight of the luggage item. The control circuit notifies the appropriate authority about weight changes in the luggage item through the personal data device.

17 Claims, 4 Drawing Sheets

(56) References Cited

U.S. PATENT DOCUMENTS

| | | | | |
|---|---|---|---|---|
| 7,151,231 B2 * | 12/2006 | Kamakau | ............... | A45C 15/00 177/126 |
| 7,156,918 B2 * | 1/2007 | Marks | ................ | A45C 13/28 16/114.1 |
| 7,238,895 B2 | 7/2007 | Dittrich | | |
| 7,281,615 B2 * | 10/2007 | Siwak | ................ | A45C 13/28 16/114.1 |
| 7,358,449 B2 * | 4/2008 | Hannon | ............. | A45F 3/14 D3/327 |
| 7,378,604 B2 * | 5/2008 | Truong | .............. | A45C 13/28 177/131 |
| 7,404,506 B1 * | 7/2008 | Ross | ............... | A45F 3/14 D3/327 |
| 7,550,684 B2 * | 6/2009 | Kritzler | ............ | G01G 19/58 177/148 |
| D646,895 S * | 10/2011 | Nolan | ............... | A45F 3/14 D3/327 |
| D653,135 S | 1/2012 | Sheikh | | |
| 8,485,329 B1 * | 7/2013 | Roy | ................ | G01G 19/58 190/116 |
| 8,575,500 B1 * | 11/2013 | Genet, Sr. | ........ | A45C 13/28 177/148 |
| 8,716,610 B2 | 5/2014 | Zyman | | |
| 8,847,754 B2 | 9/2014 | Buchheim | | |
| 8,884,170 B2 | 11/2014 | Sheikh | | |
| 8,910,843 B2 * | 12/2014 | Almalki | ............. | G01G 19/58 224/576 |
| 8,952,276 B2 | 2/2015 | Lin | | |
| 9,212,945 B2 * | 12/2015 | Edwards | ........... | G01G 17/00 |
| 9,733,118 B2 * | 8/2017 | Sheikh | ............. | G01G 19/58 |
| 9,888,755 B2 * | 2/2018 | Jacob | ............... | G01G 19/52 |
| 2002/0194935 A1 * | 12/2002 | Clarke | ............. | B66B 7/1223 73/862.391 |
| 2005/0051586 A1 * | 3/2005 | Siwak | ............... | A45C 15/00 177/131 |
| 2006/0207850 A1 | 9/2006 | Lewis | | |
| 2007/0056779 A1 * | 3/2007 | Laniado | ........... | A45C 13/28 16/114.1 |
| 2007/0261213 A1 * | 11/2007 | Nolan | ............... | A45F 3/14 24/300 |
| 2008/0011568 A1 * | 1/2008 | Siwak | ............... | G01G 19/58 190/115 |
| 2008/0083802 A1 * | 4/2008 | Reziniano | ......... | A45F 3/14 D3/327 |
| 2010/0181354 A1 * | 7/2010 | Laniado | ........... | G01G 3/00 224/259 |
| 2015/0237980 A1 * | 8/2015 | Shah | ................ | G08B 21/24 340/568.1 |
| 2016/0161324 A1 * | 6/2016 | Tse | ................. | G01G 19/58 73/862.541 |
| 2017/0219418 A1 * | 8/2017 | Kellis | .............. | G01G 19/52 |
| 2017/0343409 A1 * | 11/2017 | Natarajan | .......... | A45C 13/001 |
| 2018/0116361 A1 * | 5/2018 | Anjum | .............. | A45C 15/06 |
| 2018/0132588 A1 * | 5/2018 | Shah | ................ | A61B 5/1115 |

* cited by examiner

LUGGAGE SCALE STRAP

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of physics including measurement and weighing, more specifically, a weighing apparatus combined with another object. (G01G19/56)

SUMMARY OF INVENTION

The luggage scale strap is a shoulder strap. The luggage scale strap is configured for use with a luggage item. The luggage scale strap attaches to the luggage item. The luggage scale strap weighs the luggage item, detects changes in the weight of the luggage item, and alerts an appropriate authority when a weight change has been detected by the luggage scale strap in the luggage item. The presumption of the disclosure at bar is that a weight change in the luggage item indicates to the appropriated authority that something has been inappropriately added to or removed from the luggage item. The luggage scale strap comprises a shoulder strap, a control circuit, a personal data device, and the luggage item. The shoulder strap contains the control circuit. The shoulder strap attaches to the luggage item. The control circuit monitors the weight of the luggage item. The control circuit notifies the appropriate authority about weight changes in the luggage item through the personal data device.

These together with additional objects, features and advantages of the luggage scale strap will be readily apparent to those of ordinary skill in the art upon reading the following detailed description of the presently preferred, but nonetheless illustrative, embodiments when taken in conjunction with the accompanying drawings.

In this respect, before explaining the current embodiments of the luggage scale strap in detail, it is to be understood that the luggage scale strap is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the luggage scale strap.

It is therefore important that the claims be regarded as including such equivalent construction insofar as they do not depart from the spirit and scope of the luggage scale strap. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 5.

The luggage scale strap 100 (hereinafter invention) is a shoulder strap 101. The invention 100 is configured for use with a luggage item 104. The invention 100 attaches to the luggage item 104. The invention 100 weighs the luggage item 104, detects changes in the weight of the luggage item 104, and alerts an appropriate authority when a weight change has been detected by the invention 100 in the luggage item 104. The presumption of the disclosure at bar is that a weight change in the luggage item 104 indicates to the appropriated authority that something has been inappropriately added to or removed from the luggage item 104. The invention 100 comprises a shoulder strap 101, a control circuit 102, a personal data device 103, and the luggage item 104. The shoulder strap 101 contains the control circuit 102. The shoulder strap 101 attaches to the luggage item 104. The control circuit 102 monitors the weight of the luggage item 104. The control circuit 102 notifies the appropriate authority about weight changes in the luggage item 104 through the personal data device 103.

Figure 5:
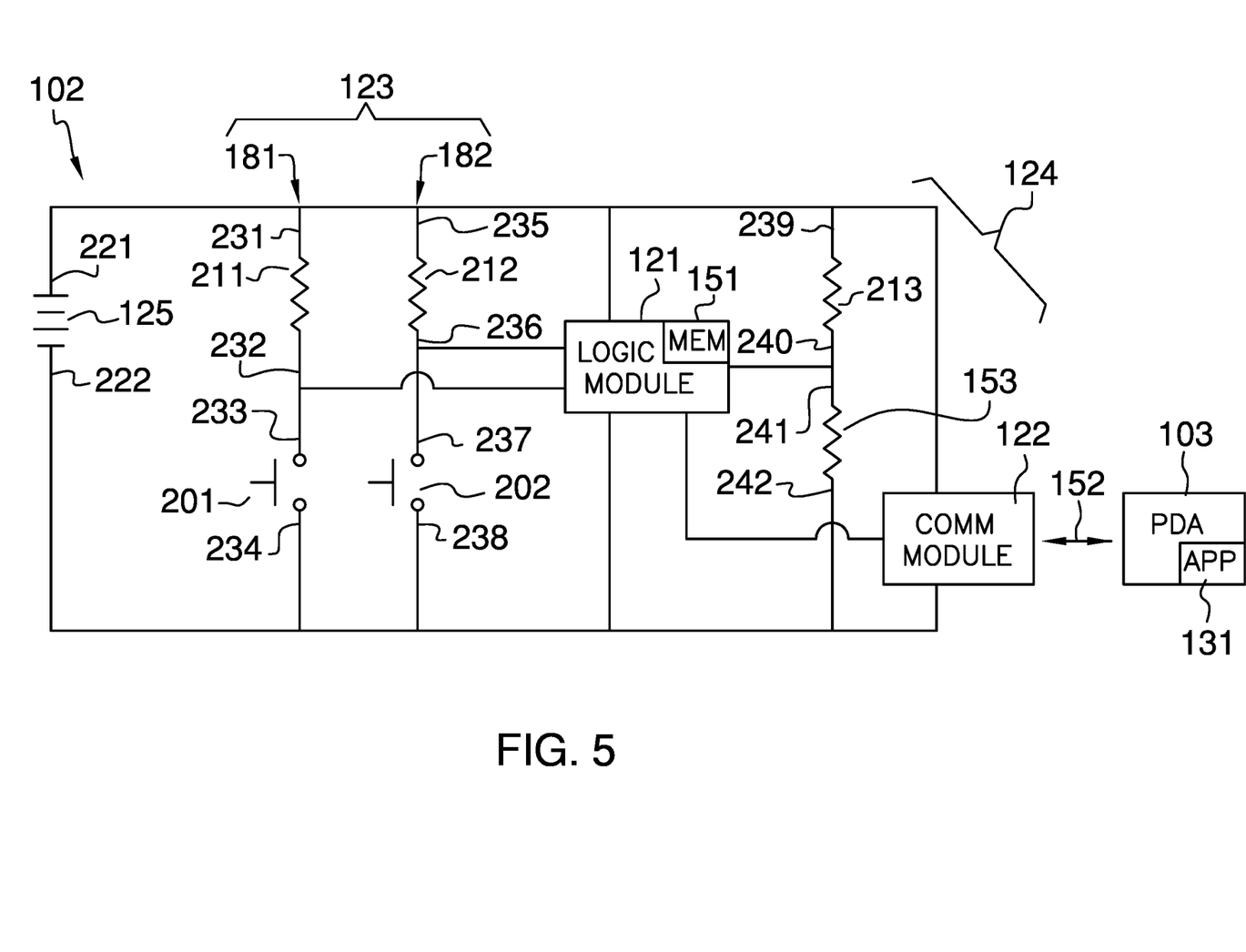
FIG. 5 is a schematic view of an embodiment of the disclosure.

The personal data device 103 is a programmable electrical device. The personal data device 103 further comprises an application 131. The personal data device 103 provides data management and communication services through the application 131. The application 131 is a set of logical operating instructions that are performed by the personal data device 103. The addition of the application 131 will provide increased functionality for the personal data device 103. In the first potential embodiment of the disclosure, the application 131 receives the alarm message from the control circuit 102 and displays the alarm message on a display that is provisioned by the personal data device 103. This disclosure assumes that the application 131 exists for the purpose of interacting with the invention 100. Methods to design and implement the application 131 on a personal data device 103 are well known and documented in the electrical arts. The personal data device 103 is further defined elsewhere in this disclosure.

Figure 1:
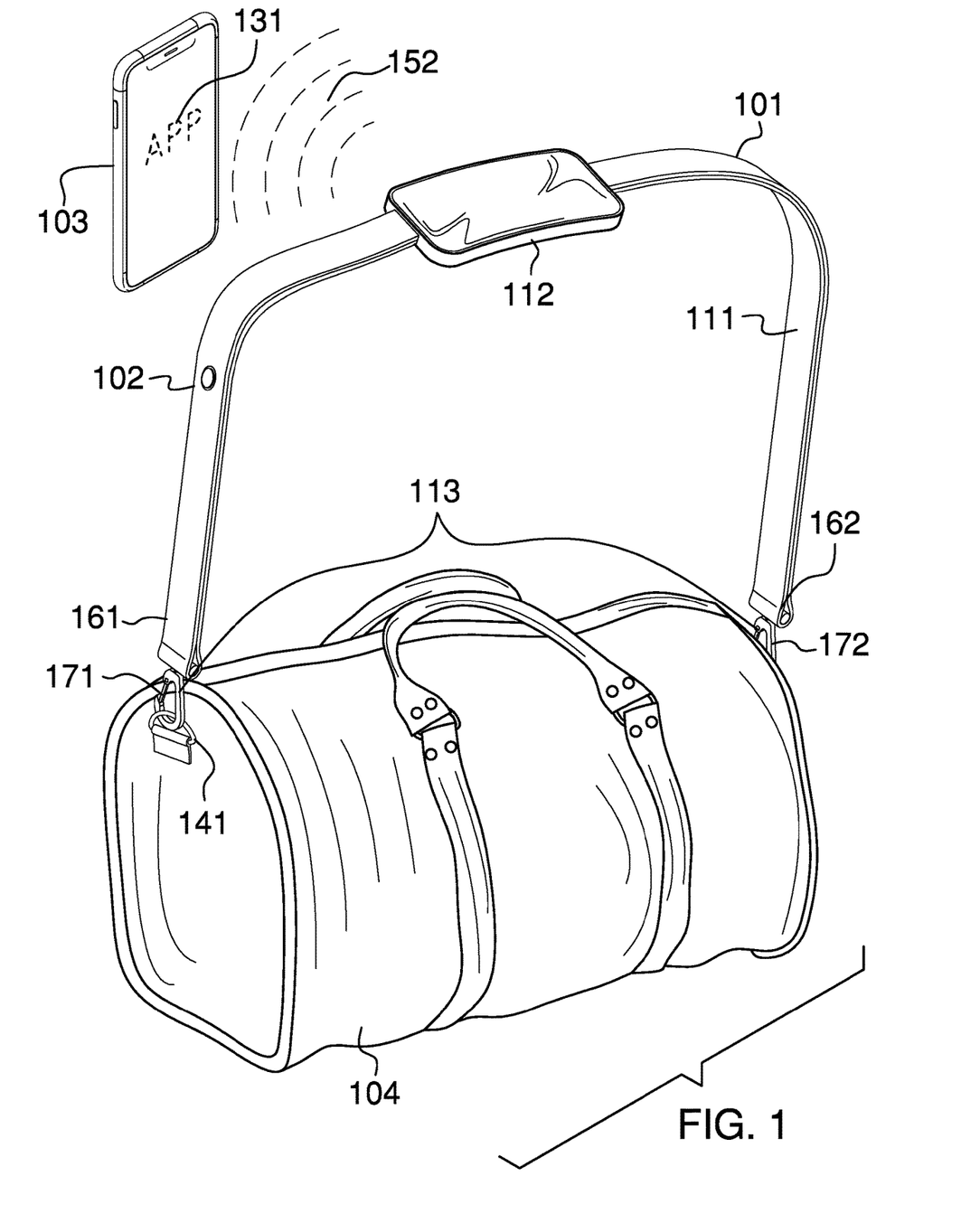
FIG. 1 is an in-use view of an embodiment of the disclosure.
Figure 2:
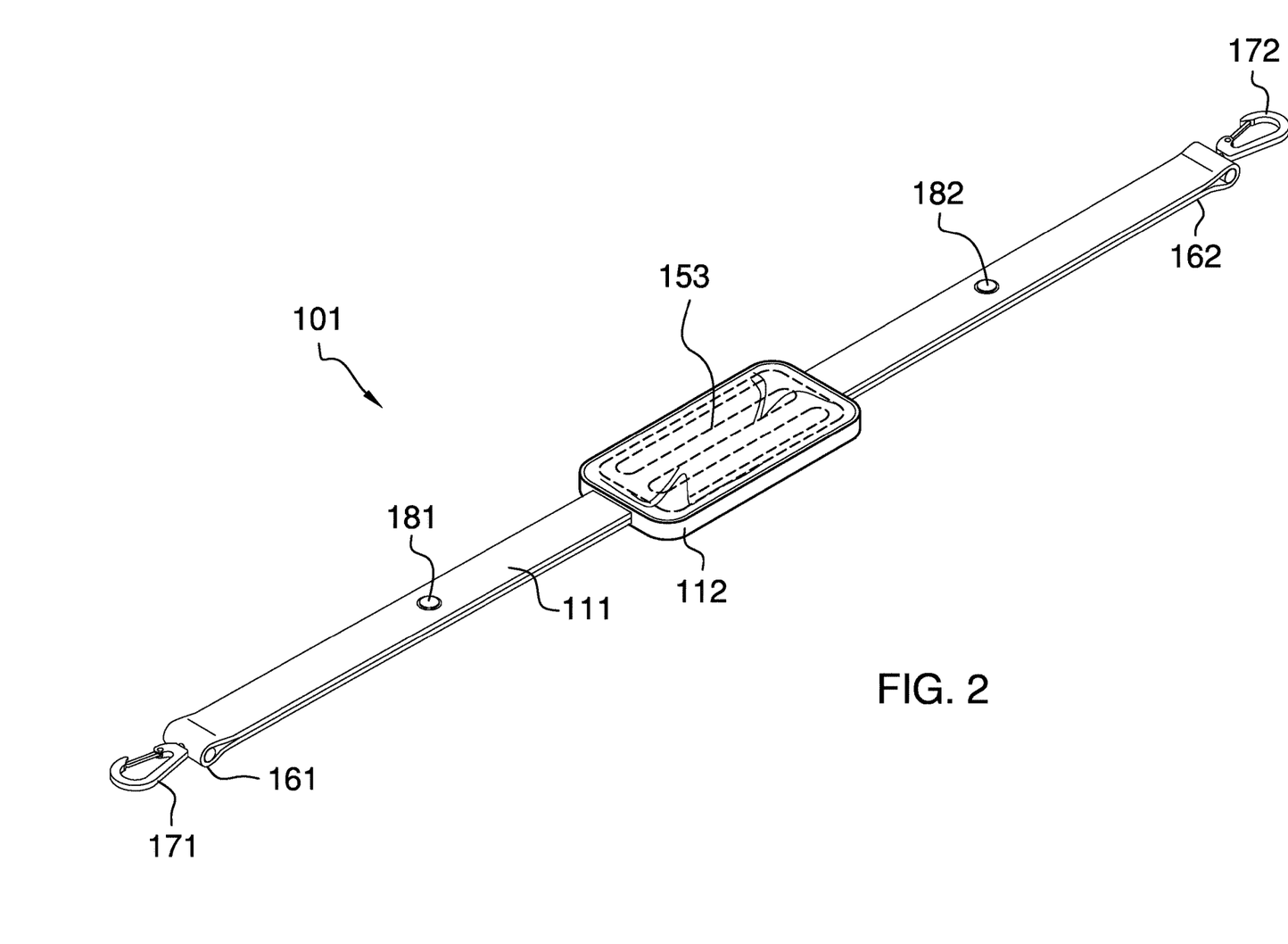
FIG. 2 is a perspective view of an embodiment of the disclosure.
Figure 3:
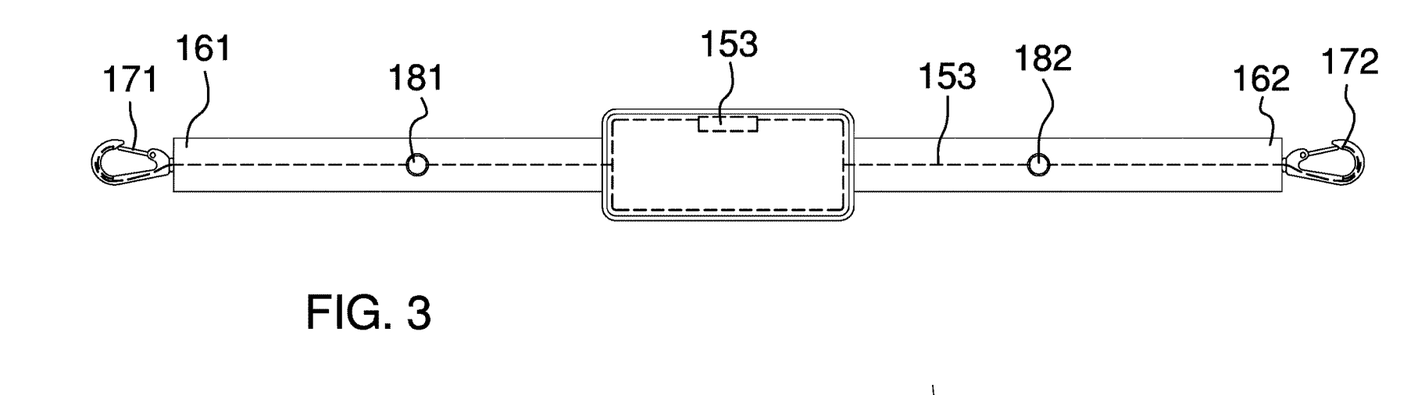
FIG. 3 is a top view of an embodiment of the disclosure.

The luggage item 104 is a container. The luggage item 104 is further defined elsewhere in this disclosure. The luggage item 104 further comprises a plurality of anchor points 141. Each of the plurality of anchor points 141 is a ring that attaches to the exterior surface of the luggage item 104. Each of the plurality of anchor points 141 forms an anchor point to which a carabiner selected from the plurality of carabiners 113 removably attaches to anchor the shoulder strap 101 to the luggage item 104.

The shoulder strap 101 is a carrying structure. The shoulder strap 101 attaches to the luggage item 104 such that the luggage item 104 is suspended on the shoulder of a user. The shoulder strap 101 contains the control circuit 102. The shoulder strap 101 comprises a webbing 111, a shoulder pad 112, and a plurality of carabiners 113. The webbing 111 is further defined with a first end 161 and a second end 162.

The webbing 111 is a textile structure. The webbing 111 forms the load path that transfers the load of the luggage item 104 to the shoulder of the user. The use of a webbing 111 to form a shoulder strap 101 is well-known and documented in the luggage arts. In the first potential embodiment of the disclosure, the webbing 111 is a tubular webbing such that selected components and cables can be threaded through the interior of the webbing 111.

Figure 4:
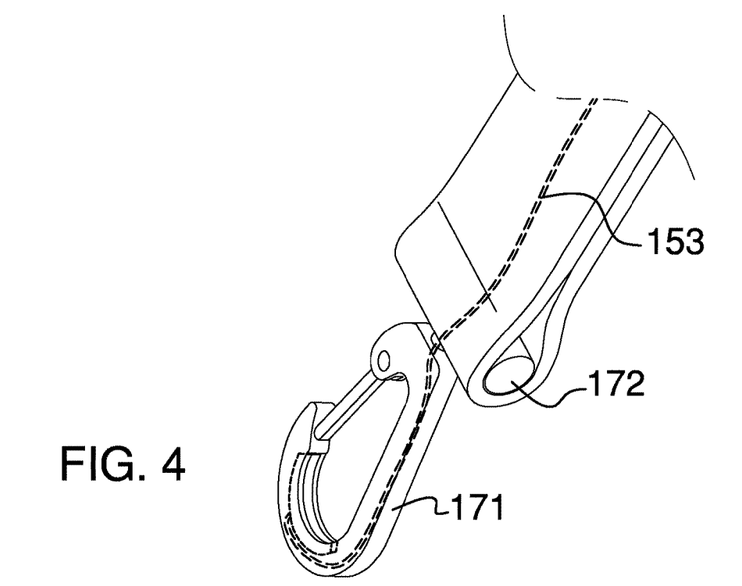
FIG. 4 is a detail view of an embodiment of the disclosure.

The shoulder pad 112 is a semi-rigid structure with an elastic nature. The semi-rigid structure of the shoulder pad 112 protects a user from injury. The shoulder pad 112 further contains the control circuit 102. The semi-rigid structure of the shoulder pad 112 allows the control circuit 102 to torque such that the control circuit 102 can determine the load of the luggage item 104 based on the measured torque. The shoulder pad 112 is formed with all apertures and form factors necessary to allow the shoulder pad 112 to accommodate the use, the operation, and the external connections of the control circuit 102. Methods to form a shoulder pad 112 suitable for the purposes described in this disclosure are well-known and documented in the mechanical arts.

Each of the plurality of carabiners 113 is a fastening structure. Each of the plurality of carabiners 113 attaches the webbing 111 of the shoulder strap 101 to the plurality of anchor points 141 of the luggage item 104. The plurality of carabiners 113 further comprises a first carabiner 171 and a second carabiner 172.

The first carabiner 171 attaches to the first end 161 of the webbing 111. The second carabiner 172 attaches to the second end 162 of the webbing 111. The first carabiner 171 removably attaches the webbing 111 to an anchor point selected from the plurality of anchor points 141 of the luggage item 104. The second carabiner 172 removably attaches the webbing 111 to an anchor point selected from the plurality of anchor points 141 of the luggage item 104.

The control circuit 102 is an electrical circuit. The control circuit 102 measures the load of the luggage item 104 as the luggage item 104 is carried on the shoulder of a user. The control circuit 102 compares the load of the luggage item 104 against a previously measured load of the luggage item 104. If the control circuit 102 finds a difference between the weight of the luggage item 104 and the previously measured load of the luggage item 104 that is greater than a previously determined parameter, the control circuit 102 send an alarm message to the personal data device 103. The control circuit 102 comprises a logic module 121, a communication module 122, a plurality of tare signals 123, a strain gauge 124, and a battery 125. The battery 125 is further defined with a positive terminal 221 and a negative terminal 222.

The logic module 121 is a readily and commercially available programmable electronic device that is used to manage, regulate, and operate the control circuit 102. Depending on the specific design and the selected components, the logic module 121 can be a separate component within the control circuit 102 or the functions of the logic module 121 can be incorporated into another component within the control circuit 102. The communication module 122 is a wireless electronic communication device that allows the logic module 121 to wirelessly communicate with the personal data device 103 as a locally presented device. Specifically, the communication module 122 establishes a wireless communication link 152 between the control circuit 102 and the personal data device 103. In the first potential embodiment of the disclosure, the communication module 122 supports a communication protocol selected from the group consisting of a WiFi™ protocol or a BlueTooth™ protocol.

The logic module 121 further comprises a memory device 151. The memory device 151 is an electronic device that stores information in a digital format. In the first potential embodiment of the disclosure, the memory device 151 is provisioned with the logic module 121. The memory device 151 physically stores the weight of the luggage item 104 that is measured when a tare signal selected from the plurality of tare signals 123 is actuated.

Each of the plurality of tare signals 123 is a switching circuit. Each of the plurality of tare signals 123 is monitored by the logic module 121. Each of the plurality of tare signals 123 indicates to the logic module 121 that the weight of the luggage item 104 as currently measured by the strain gauge 124 should be stored in the pressure sensor strip 153 of the logic module 121. The plurality of tare signals 123 further comprises a first tare signal 181 and a second tare signal 182.

The first tare signal 181 is a switching circuit selected from the plurality of tare signals 123. The logic module 121 monitors the first tare signal 181. The first tare signal 181 signals to the logic module 121 to store the weight of the luggage item 104 currently measured by the strain gauge 124 in the memory device 151 of the logic module 121. The first tare signal 181 further comprises a first momentary switch 201 and a first pull-up resistor 211. The first pull-up resistor 211 is further defined with a first lead 231 and a second lead 232. The first momentary switch 201 is further defined with a third lead 233 and a fourth lead 234.

The first pull-up resistor 211 is an electrical resistor. The first pull-up resistor 211 limits the flow of electricity through the first momentary switch 201. The first momentary switch 201 is a commercially available normally open momentary switch. The first momentary switch 201 is wired in series with the first pull-up resistor 211 and the battery 125. The first momentary switch 201 is wired such that the first momentary switch 201 presents a voltage to the logic module 121 when the first momentary switch 201 is in the open position.

The second tare signal 182 is a switching circuit selected from the plurality of tare signals 123. The logic module 121 monitors the second tare signal 182. The second tare signal 182 signals to the logic module 121 to store the weight of the luggage item 104 currently measured by the strain gauge 124 in the memory device 151 of the logic module 121. The second tare signal 182 further comprises a second momentary switch 202 and a second pull-up resistor 212. The second pull-up resistor 212 is further defined with a fifth lead 235 and a sixth lead 236. The second momentary switch 202 is further defined with a seventh lead 237 and an eighth lead 238.

The second pull-up resistor 212 is an electrical resistor. The second pull-up resistor 212 limits the flow of electricity through the second momentary switch 202. The second momentary switch 202 is a commercially available normally open momentary switch. The second momentary switch 202 is wired in series with the second pull-up resistor 212 and the battery 125. The second momentary switch 202 is wired such that the second momentary switch 202 presents a voltage to the logic module 121 when the second momentary switch 202 is in the open position.

The strain gauge 124 is an electromechanical device. The strain gauge 124 is a sensor. The strain gauge 124 is an electromechanical device that measures the load placed on the shoulder strap 101 by the luggage item 104. Specifically, the strain gauge 124 presents a voltage to the logic module 121. The presented voltage varies as a function of the load of the luggage item 104. The logic module 121 uses the presented voltage to calculate the weight of the luggage item 104. The strain gauge 124 further comprises a pressure sensor strip 153 and a third pull-up resistor 213. The third pull-up resistor 213 is further defined with a ninth lead 239 and a tenth lead 240. The pressure sensor strip 153 is further defined with an eleventh lead 241 and a twelfth lead 242.

The pressure sensor strip 153 forms a series circuit with the battery 125 and the third pull-up resistor 213. The pressure sensor strip 153 and the third pull-up resistor 213 form a voltage divider that allows the voltage across the pressure sensor strip 153 to vary as the resistance presented by the pressure sensor strip 153 varies.

The third pull-up resistor 213 is an electrical resistor. The third pull-up resistor 213 forms the fixed resistance component of the voltage divider that forms the strain gauge 124. The pressure sensor strip 153 is an electrical device known as a bonded foil strain gauge. The pressure sensor strip 153 is a resistance based device. The resistance of the pressure sensor strip 153 varies as a function of the torque applied to the pressure sensor strip 153. In the first potential embodiment, the applicant used a flexible flat pressure sensor strip 153 known as a FlexForce™ Pressure Sensor that is sold through SparkFun™ as part number SEN-08685ROH. In alternate potential embodiments, the pressure sensor strip 153 can be replaced with a suitable piezoelectric device.

The pressure sensor strip 153 mounts in the shoulder pad 112 such that the pressure sensor strip 153 bends around the shoulder when the shoulder strap 101 is placed under a load.

The battery 125 is an electrochemical device. The battery 125 converts chemical potential energy into electrical energy used to power the control circuit 102 of the invention 100.

The following two paragraphs describe the use and operation of the invention 100. The shoulder strap 101 attaches to the plurality of anchor points 141 of the luggage item 104 and is carried on the shoulder of the user.

A tare signal selected from the plurality of tare signals 123 is actuated to store the measured weight of the luggage item 104 in the memory device 151 of the logic module 121. The selected tare signal is actuated by actuating a momentary switch selected from the group consisting of the first momentary switch 201 and the second momentary switch 202. The logic module 121 regularly measures the voltage across the pressure sensor strip 153 to estimate an updated weight of the luggage item 104. The logic module 121 calculates an estimated weight difference. The estimated weight difference equals the absolute value of the difference between the estimated updated weights of the luggage with the weight stored in the memory device 151 of the logic module 121.

If the calculated weight difference falls within a previously determined parameter selected from the group consisting of a negligible difference and a not significant difference, the logic module 121 continues to monitor the pressure sensor strip 153 and takes no additional action. The term negligible difference is defined elsewhere in this disclosure. The term not significantly different is defined elsewhere in this disclosure. If the calculated weight difference falls outside the previously determined parameter, the logic module 121 sends an alarm message to the application 131 of the personal data device 103 over the wireless communication link 152 using the communication module 122.

The following four paragraphs describe the assembly of the control circuit 102.

The positive terminal 221 of the battery 125 electrically connects to the first lead 231 of the first pull-up resistor 211. The positive terminal 221 of the battery 125 electrically connects to the fifth lead 235 of the second pull-up resistor 212. The positive terminal 221 of the battery 125 electrically connects to the ninth lead 239 of the third pull-up resistor 213. The positive terminal 221 of the battery 125 electrically connects to the power input of the logic module 121. The positive terminal 221 of the battery 125 electrically connects to the power input of the communication module 122.

The second lead 232 of the first pull-up resistor 211 electrically connects to the third lead 233 of the first momentary switch 201. The sixth lead 236 of the second pull-up resistor 212 electrically connects to the seventh lead 237 of the second momentary switch 202. The logic module 121 electrically connects to the third lead 233 of the first momentary switch 201. The logic module 121 electrically connects to the seventh lead 237 of the second momentary switch 202. The tenth lead 240 of the third pull-up resistor 213 electrically connects to the eleventh lead 241 of the pressure sensor strip 153.

If the logic module 121 detects a voltage drop across the third lead 233, the logic module 121 stores the weight currently detected at the pressure sensor strip 153 in the memory device 151. If the logic module 121 detects a voltage drop across the seventh lead 237, the logic module 121 stores the weight currently detected at the pressure sensor strip 153 in the memory device 151.

The logic module 121 measures the voltage at the eleventh lead 241 of the pressure sensor strip 153. The logic module 121 uses the measured voltage across the pressure sensor strip 153 to estimate the weight of the luggage item 104.

The negative terminal 222 of the battery 125 electrically connects to the fourth lead 234 of the first momentary switch 201. The negative terminal 222 of the battery 125 electrically connects to the eighth lead 238 of the second momentary switch 202. The negative terminal 222 of the battery 125 electrically connects to the twelfth lead 242 of the pressure sensor strip 153. The negative terminal 222 of the battery 125 electrically connects to the ground input of the logic module 121. The negative terminal 222 of the battery 125 electrically connects to the ground input of the communication module 122.

The following definitions were used in this disclosure:

Anchor: As used in this disclosure, anchor means to hold an object firmly or securely.

Anchor Point: As used in this disclosure, an anchor point is a location to which a first object can be securely attached to a second object.

Application or App: As used in this disclosure, an application or app is a self-contained piece of software that is specially designed or downloaded for use with a personal data device.

Appropriate Authority: As used in this disclosure, an appropriate authority is a previously determined person or organization that is designated to send and receive alarm or other notification messages regarding a monitored system or activity.

Battery: As used in this disclosure, a battery is a chemical device consisting of one or more cells, in which chemical energy is converted into electricity and used as a source of power. Batteries are commonly defined with a positive terminal and a negative terminal.

Bluetooth™: As used in this disclosure, Bluetooth™ is a standardized communication protocol that is used to wirelessly interconnect electronic devices.

Cable: As used in this disclosure, a cable is a collection of insulated wires covered by a protective casing that is used for transmitting electricity or telecommunication signals.

Carabiner: As used in this disclosure, a carabiner is coupling link that is usually formed as an oblong metal ring with one spring hinged side that is used to open and close the ring. Synonyms for carabiner include D-link.

Cord: As used in this disclosure, a cord is a long, thin, flexible, and prism-shaped string, line, rope, or wire. Cords are made from yarns, piles, or strands of material that are braided or twisted together or from a monofilament (such as fishing line). Cords have tensile strength but are too flexible to provide compressive strength and are not suitable for use in pushing objects. String, line, cable, and rope are synonyms for cord.

Cushion: As used in this disclosure a cushion is a structure formed with a pad that is used to prevent injury or damage to a person or object.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Housing: As used in this disclosure, a housing is a casing that encloses and protects one or more devices.

Inferior: As used in this disclosure, the term inferior refers to a directional reference that is parallel to and in the same direction as the force of gravity when an object is positioned or used normally.

Lead: As used in this disclosure, a lead is a conductor that is physically used to electrically connect an electrical component into a larger circuit assembly.

Load Cell: As used in this disclosure, a load cell is a transducer that measures an applied force and generates an electrical signal that is a known function of the applied force. A load cell is often used to measure weights.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Logic Module: As used in this disclosure, a logic module is a readily and commercially available electrical device that is programmable and that accepts digital and analog inputs, processes the digital and analog inputs according to previously stored instruction and provides the results of these instructions as digital or analog outputs.

Logical Device: As used in this disclosure, a logical device is a programmable electrical device that processes externally provided inputs to generate outputs that are determined from a previously programmed set of instructions.

Luggage: As used in this disclosure, luggage is a trunk, bag, parcel, suitcase, or backpack in which domestic articles are contained during travel.

Memory Device: As used in this device, a memory device is an electronic device that stores information (including audio and video data) in a digital format. Common memory devices include the RAM (random access memory) and disk drives in a computer, USB (Universal Serial Bus) drives, DVD (Digital Video Disk) formatted video, and SD (secure digital) cards.

Momentary Switch: As used in this disclosure, a momentary switch is a biased switch in the sense that the momentary switch has a baseline position that only changes when the momentary switch is actuated (for example when a pushbutton switch is pushed or a relay coil is energized). The momentary switch then returns to the baseline position once the actuation is completed. This baseline position is called the "normal" position. For example, a "normally open" momentary switch interrupts (open) the electric circuit in the baseline position and completes (closes) the circuit when the momentary switch is activated. Similarly, a "normally closed" momentary switch will complete (close) an electric circuit in the baseline position and interrupt (open) the circuit when the momentary switch is activated.

Negligible Difference: As used in this disclosure, the term negligible difference is a term that compares a specified property of a first object to the corresponding property of a reference object (reference property). The specified property is considered to have a negligible difference from the reference property when the absolute value of the difference between the specified property and the reference property is less than 1.0% of the reference property value.

Not Significantly Different: As used in this disclosure, the term not significantly different compares a specified property of a first object to the corresponding property of a reference object (reference property). The specified property is considered to be not significantly different from the reference property when the absolute value of the difference between the specified property and the reference property is less than 10.0% of the reference property value. A negligible difference is considered to be not significantly different.

Normally Closed: As used in this disclosure, normally closed refers to an externally controlled electrical switching device, such as a relay or a momentary switch, which passes electric current when the externally controlled electrical switching device is in an unpowered state.

Normally Open: As used in this disclosure, normally open refers to an externally controlled electrical switching device, such as a relay or a momentary switch, which does not pass electric current when the externally controlled electrical switching device is in an unpowered state.

Pad: As used in this disclosure, a pad is a mass of soft material used as a filling or for protection against damage or injury. Commonly used padding materials include, but are not limited to, polyurethane foam, silicone, a polyester fill often referred to as fiberfill or polystyrene beads often referred to as stuffing beans or as bean bag chair beans.

PDD: As used in this disclosure, PDD is an acronym for personal data device.

Personal Data Device: As used in this disclosure, a personal data device is a handheld logical device that is used for managing personal information and communication. Examples of personal data device include, but are not limited to, cellular phones, tablets, and smartphones. See logical device Piezoelectric Effect: As used in this disclosure, the piezoelectric effect refers to a class of materials wherein a strain placed upon the material will result in a redistribution of electrons within the material in a manner that causes an electric charge. This electric charge can be measured as: a) a voltage potential across the material; or, b) a change in resistance across the material. This effect can be reversed in some of these materials such that the application of an AC voltage to the material will cause a vibration within the material. A material commonly used to take advantage of the piezoelectric effect is polyvinylidene difluoride (CAS 24937-79-9) which is also known as PVDF.

Pull-Up Resistor: As used in this disclosure, a pull-up resistor is an electrical resistor that is used to: 1) limit the current flow through a switching device; and, 2) to control the voltage level presented across a switch, a load resistor, or a pull-down resistor.

Resistor: As used in this disclosure, a resistor is a well-known and commonly available electrical device that inhibits the flow of electricity through an electric circuit. Within an electric circuit processing alternating currents, the resistor will not affect the phase of the alternating current. A current flowing through a resistor will create a voltage across the terminals of the resistor.

Semi-Rigid Structure: As used in this disclosure, a semi-rigid structure is a solid structure that is stiff but not wholly inflexible, and that will deform under force before breaking. A semi-rigid structure may or may not behave with an elastic nature in that a semi-rigid structure need not return to its relaxed shape.

Sensor: As used in this disclosure, a sensor is a device that receives and responds in a predetermined way to a signal or stimulus. As further used in this disclosure, a threshold sensor is a sensor that generates a signal that indicates whether the signal or stimulus is above or below a given threshold for the signal or stimulus.

Shoulder Strap: As used in this disclosure, a shoulder strap is a strap used to carry an object over a shoulder.

Strap: As used in this disclosure a strap is a strip of leather, cloth, or other flexible material, often with a buckle, that is used to fasten, secure, carry, or hold onto something.

Strip: As used in this disclosure, the term describes a long and narrow object of uniform thickness that appears thin relative to the length of the object. Strips are often rectangular in shape.

Suspend: As used in this disclosure, to suspend an object means to support an object such that the inferior end of the object does not form a significant portion of the load path of the object.

Superior: As used in this disclosure, the term superior refers to a directional reference that is parallel to and in the opposite direction of the force of gravity when an object is positioned or used normally.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

Switching Circuit: As used in this disclosure, a switching circuit is non-programmable electrical device that receives an input to generate one or more digital or analog outputs.

Tare: As used in this disclosure, tare means to deduct a current or existing weight measurement being displayed on an instrument from the display of future mass measurements made on the instrument. As one of many examples of this is practice, scales are often tared to deduct the weight of packaging included in gross weight from the net weight of a sold product.

Textile: As used in this disclosure, a textile is a material that is woven, knitted, braided or felted. Synonyms in common usage for this definition include fabric and cloth.

Thread: As used in this disclosure, to thread is a verb that refers to inserting a cord through a hole or channel.

Torque: As used in this disclosure, a torque refers to a force that causes an object to bend or rotate.

Tubular Textile: As used in this disclosure, a tubular textile is a textile that is woven, knitted, or braided into a seamless tube-like shape.

Webbing: As used in this disclosure, a webbing is strong, close woven or knitted fabric that is used for straps or belting. As used in this disclosure, webbing is a fully formed material that is only cut to length for use. Webbing is not formed by cutting broader materials into strips. Webbings have tensile strength but are too flexible to provide compressive strength and are not suitable for use in pushing objects. The two surfaces of a webbing with the greatest surface area are called the faces of the webbing.

WiFi™: As used in this disclosure, WiFi™ refers to the physical implementation of a collection of wireless electronic communication standards commonly referred to as IEEE 802.11x.

Wireless: As used in this disclosure, wireless is an adjective that is used to describe a communication channel between two devices that does not require the use of physical cabling.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A luggage scale comprising:
wherein the luggage scale comprises a shoulder strap, a control circuit, and a personal data device;
wherein the shoulder strap contains the control circuit;
wherein the control circuit communicates with the personal data device;
wherein the luggage scale is configured for use with a luggage item;
wherein the luggage scale attaches to the luggage item;
wherein the luggage scale weighs the luggage item;
wherein the luggage scale detects changes in the weight of the luggage item;
wherein the control circuit transmits an alarm message the personal data device when a weight change in the luggage item is detected;
wherein the control circuit comprises a logic module, a communication module, a plurality of tare signals, a strain gauge, and a battery;
wherein the logic module, the communication module, the plurality of tare signals, the strain gauge, and the battery are electrically interconnected;
wherein the strain gauge measures the weight of the luggage item;
wherein the battery is an electrochemical device;
wherein the battery converts chemical potential energy into electrical energy used to power the control circuit of the luggage scale;
wherein the battery is further defined with a positive terminal and a negative terminal;
wherein the logic module is programmable electronic;
wherein the communication module is a wireless electronic communication device that allows the logic module to wirelessly communicate with the personal data device as a locally presented device;
wherein the communication module establishes a wireless communication link between the control circuit and the personal data device;
wherein each of the plurality of tare signals is a switching circuit;
wherein the plurality of tare signals further comprises a first tare signal and a second tare signal;
wherein the first tare signal is a switching circuit selected from the plurality of tare signals;
wherein the logic module monitors the first tare signal;
wherein the first tare signal signals to the logic module to store the weight of the luggage item currently measured by the strain gauge in the memory device of the logic module;
wherein the second tare signal is a switching circuit selected from the plurality of tare signals;
wherein the logic module monitors the second tare signal;
wherein the second tare signal signals to the logic module to store the weight of the luggage item currently measured by the strain gauge in the memory device of the logic module;
wherein the first tare signal further comprises a first momentary switch and a first pull-up resistor;
wherein the second tare signal further comprises a second momentary switch and a second pull-up resistor;
wherein the first pull-up resistor is further defined with a first lead and a second lead;
wherein the first momentary switch is further defined with a third lead and a fourth lead;
wherein the second pull-up resistor is further defined with a fifth lead and a sixth lead;
wherein the second momentary switch is further defined with a seventh lead and an eighth lead;
wherein the first pull-up resistor is an electrical resistor;
wherein the first pull-up resistor limits the flow of electricity through the first momentary switch;
wherein the first momentary switch is a commercially available normally open momentary switch;
wherein the first momentary switch is wired in series with the first pull-up resistor and the battery;
wherein the first momentary switch is wired such that the first momentary switch presents a voltage to the logic module when the first momentary switch is in the open position;
wherein the second pull-up resistor is an electrical resistor;
wherein the second pull-up resistor limits the flow of electricity through the second momentary switch;
wherein the second momentary switch is a commercially available normally open momentary switch;
wherein the second momentary switch is wired in series with the second pull-up resistor and the battery;
wherein the second momentary switch is wired such that the second momentary switch presents a voltage to the logic module when the second momentary switch is in the open position.

2. The luggage scale according to claim 1 wherein the shoulder strap attaches to the luggage item;
wherein the control circuit monitors the weight of the luggage item.

3. The luggage scale according to claim 2 wherein the personal data device is a programmable electrical device;
wherein the personal data device further comprises an application;
wherein the personal data device provides data management and communication services through the application;
wherein the application receives the alarm message from the control circuit;
wherein the application displays the alarm message on the personal data device.

4. The luggage scale according to claim 3
wherein the luggage item is a container;
wherein the luggage item further comprises a plurality of anchor points;
wherein each of the plurality of anchor points is a ring that attaches to the exterior surface of the luggage item.

5. The luggage scale according to claim 4
wherein the shoulder strap is a carrying structure;
wherein the shoulder strap attaches to the luggage item such that the shoulder strap suspends the luggage item.

6. The luggage scale according to claim 5
wherein the control circuit is an electrical circuit;
wherein the control circuit measures the load of the luggage item as the luggage item is suspended by the shoulder strap;
wherein the control circuit compares the load of the luggage item against a previously measured load of the luggage item;
wherein if the control circuit finds a difference between the weight of the luggage item and the previously measured load of the luggage item that is greater than a previously determined parameter, the control circuit sends an alarm message to the personal data device.

7. The luggage scale according to claim 6
wherein the shoulder strap comprises a webbing, a shoulder pad, and a plurality of carabiners;

wherein the shoulder pad and the plurality of carabiners attach to the webbing;
wherein the webbing is further defined with a first end and a second end.

8. The luggage scale according to claim 7 wherein the webbing forms the load path that suspends the load of the luggage item.

9. The luggage scale according to claim 8 wherein the shoulder pad is a semi-rigid structure with an elastic nature;
wherein the shoulder pad further contains the control circuit.

10. The luggage scale according to claim 9
wherein each of the plurality of carabiners is a fastening structure;
wherein each of the plurality of carabiners attaches the webbing of the shoulder strap to the plurality of anchor points of the luggage item.

11. The luggage scale according to claim 10
wherein the plurality of carabiners further comprises a first carabiner and a second carabiner;
wherein the first carabiner attaches to the first end of the webbing;
wherein the second carabiner attaches to the second end of the webbing;
wherein the first carabiner removably attaches the webbing to an anchor point selected from the plurality of anchor points of the luggage item;
wherein the second carabiner removably attaches the webbing to an anchor point selected from the plurality of anchor points of the luggage item.

12. The luggage scale according to claim 11
wherein the logic module further comprises a memory device;
wherein the memory device is an electronic device that stores information in a digital format;
wherein the memory device physically stores the weight of the luggage item that is measured when a tare signal selected from the plurality of tare signals is actuated.

13. The luggage scale according to claim 12
wherein the strain gauge is an electromechanical device;
wherein the strain gauge is a sensor;
wherein the strain gauge is an electromechanical device that measures the load placed on the shoulder strap by the luggage item;
wherein the strain gauge presents a voltage to the logic module;
wherein the presented voltage varies as a function of the load of the luggage item;
wherein the logic module uses the presented voltage to calculate the weight of the luggage item.

14. The luggage scale according to claim 13
wherein the strain gauge further comprises a pressure sensor strip and a third pull-up resistor;
wherein the third pull-up resistor is further defined with a ninth lead and a tenth lead;
wherein the pressure sensor strip is further defined with an eleventh lead and a twelfth lead;
wherein the pressure sensor strip forms a series circuit with the battery and the third pull-up resistor;
wherein the pressure sensor strip and the third pull-up resistor form a voltage divider;
wherein the third pull-up resistor is an electrical resistor;
wherein the third pull-up resistor forms the fixed resistance component of the voltage divider;
wherein the pressure sensor strip is a resistance based device;
wherein the resistance of the pressure sensor strip varies as a function of the torque applied to the pressure sensor strip.

15. The luggage scale according to claim 14
wherein the positive terminal of the battery electrically connects to the first lead of the first pull-up resistor;
wherein the positive terminal of the battery electrically connects to the fifth lead of the second pull-up resistor;
wherein the positive terminal of the battery electrically connects to the ninth lead of the third pull-up resistor;
wherein the positive terminal of the battery electrically connects to the power input of the logic module;
wherein the positive terminal of the battery electrically connects to the power input of the communication module;
wherein the second lead of the first pull-up resistor electrically connects to the third lead of the first momentary switch;
wherein the sixth lead of the second pull-up resistor electrically connects to the seventh lead of the second momentary switch;
wherein the logic module electrically connects to the third lead of the first momentary switch;
wherein the logic module electrically connects to the seventh lead of the second momentary switch;
wherein the tenth lead of the third pull-up resistor electrically connects to the eleventh lead of the pressure sensor strip;
wherein if the logic module detects a voltage drop across the third lead, the logic module stores the weight currently detected at the pressure sensor strip in the memory device;
wherein if the logic module detects a voltage drop across the seventh lead, the logic module stores the weight currently detected at the pressure sensor strip in the memory device;
wherein the logic module measures the voltage at the eleventh lead of the pressure sensor strip;
wherein the logic module uses the measured voltage across the pressure sensor strip to estimate the weight of the luggage item;
wherein the negative terminal of the battery electrically connects to the fourth lead of the first momentary switch;
wherein the negative terminal of the battery electrically connects to the eighth lead of the second momentary switch;
wherein the negative terminal of the battery electrically connects to the twelfth lead of the pressure sensor strip;
wherein the negative terminal of the battery electrically connects to the ground input of the logic module;
wherein the negative terminal of the battery electrically connects to the ground input of the communication module;
wherein the pressure sensor strip is an electrical device known as a bonded foil strain gauge;
wherein the pressure sensor strip mounts in the shoulder pad such that the pressure sensor strip bends around the shoulder when the shoulder strap is placed under a load;
wherein the logic module calculates an estimated weight difference;
wherein the estimated weight difference equals the absolute value of the difference between the estimated updated weights of the luggage with the weight stored in the memory device of the logic module;

wherein if the calculated weight difference falls within a previously determined parameter selected from the group consisting of a negligible difference and a not significant difference, the logic module continues to monitor the pressure sensor strip and takes no additional action;

wherein if the calculated weight difference falls outside the previously determined parameter, the logic module sends an alarm message to the application of the personal data device over the wireless communication link using the communication module.

16. The luggage scale according to claim 15 wherein the webbing is a tubular webbing.

17. The luggage scale according to claim 16 wherein the plurality of carabiners further comprises a first carabiner and a second carabiner;

wherein the first carabiner attaches to the first end of the webbing;

wherein the second carabiner attaches to the second end of the webbing;

wherein the first carabiner removably attaches the webbing to an anchor point selected from the plurality of anchor points of the luggage item;

wherein the second carabiner removably attaches the webbing to an anchor point selected from the plurality of anchor points of the luggage item.

\* \* \* \* \*